United States Patent
Lee

(10) Patent No.: US 8,484,678 B2
(45) Date of Patent: Jul. 9, 2013

(54) IMAGE DISPLAY APPARATUS AND OPERATING METHOD THEREFORE FOR UPDATING THUMBNAIL IMAGES IN A THUMBNAIL LIST

(75) Inventor: Minsup Lee, Seoul (KR)

(73) Assignee: LG Electronics Inc., Seoul (KR)

(*) Notice: Subject to any disclaimer, the term of this patent is extended or adjusted under 35 U.S.C. 154(b) by 340 days.

(21) Appl. No.: 12/876,823

(22) Filed: Sep. 7, 2010

(65) Prior Publication Data

US 2011/0061075 A1    Mar. 10, 2011

(30) Foreign Application Priority Data

Sep. 7, 2009    (KR) .................. 10-2009-0084173

(51) Int. Cl.
G06F 3/00     (2006.01)
G06F 13/00    (2006.01)
H04N 5/445    (2011.01)

(52) U.S. Cl.
USPC .............. 725/38; 725/41; 725/45; 725/46; 725/52; 725/56; 348/563; 348/564

(58) Field of Classification Search
USPC ........... 725/38, 39, 41, 45, 46, 52, 56, 59, 725/132, 140, 152; 348/563, 564, 565
See application file for complete search history.

(56) References Cited

U.S. PATENT DOCUMENTS

| 8,046,795 B2 * | 10/2011 | Nguyen | 725/43 |
| 8,176,011 B2 * | 5/2012 | Carmel et al. | 707/634 |
| 2007/0214482 A1 * | 9/2007 | Nguyen | 725/91 |
| 2011/0219056 A1 * | 9/2011 | Carmel et al. | 709/202 |

FOREIGN PATENT DOCUMENTS

| KR | 10-2004-0098988 | 11/2004 |
| KR | 10-2007-0065529 | 6/2007 |
| KR | 10-2009-0002693 | 1/2009 |

OTHER PUBLICATIONS

International Search Report dated May 25, 2011 for Application PCT/KR2010/006045.

* cited by examiner

*Primary Examiner* — Hoang-Vu A Nguyen-Ba
(74) *Attorney, Agent, or Firm* — KED & Associates, LLP

(57) ABSTRACT

A method and apparatus are provided for updating thumbnail images in a thumbnail list. A plurality of thumbnail images may be generated based on television channels. A thumbnail list including a portion or all of the plurality of the generated thumbnail images may be provided for output to a display. The thumbnail list may be updated such that an image of at least one thumbnail image is changed. A frequency of change in the image of the at least one thumbnail image is greater than other thumbnail images in the thumbnail list during a prescribed time period. The updated thumbnail list may be provided for output to a display.

19 Claims, 13 Drawing Sheets

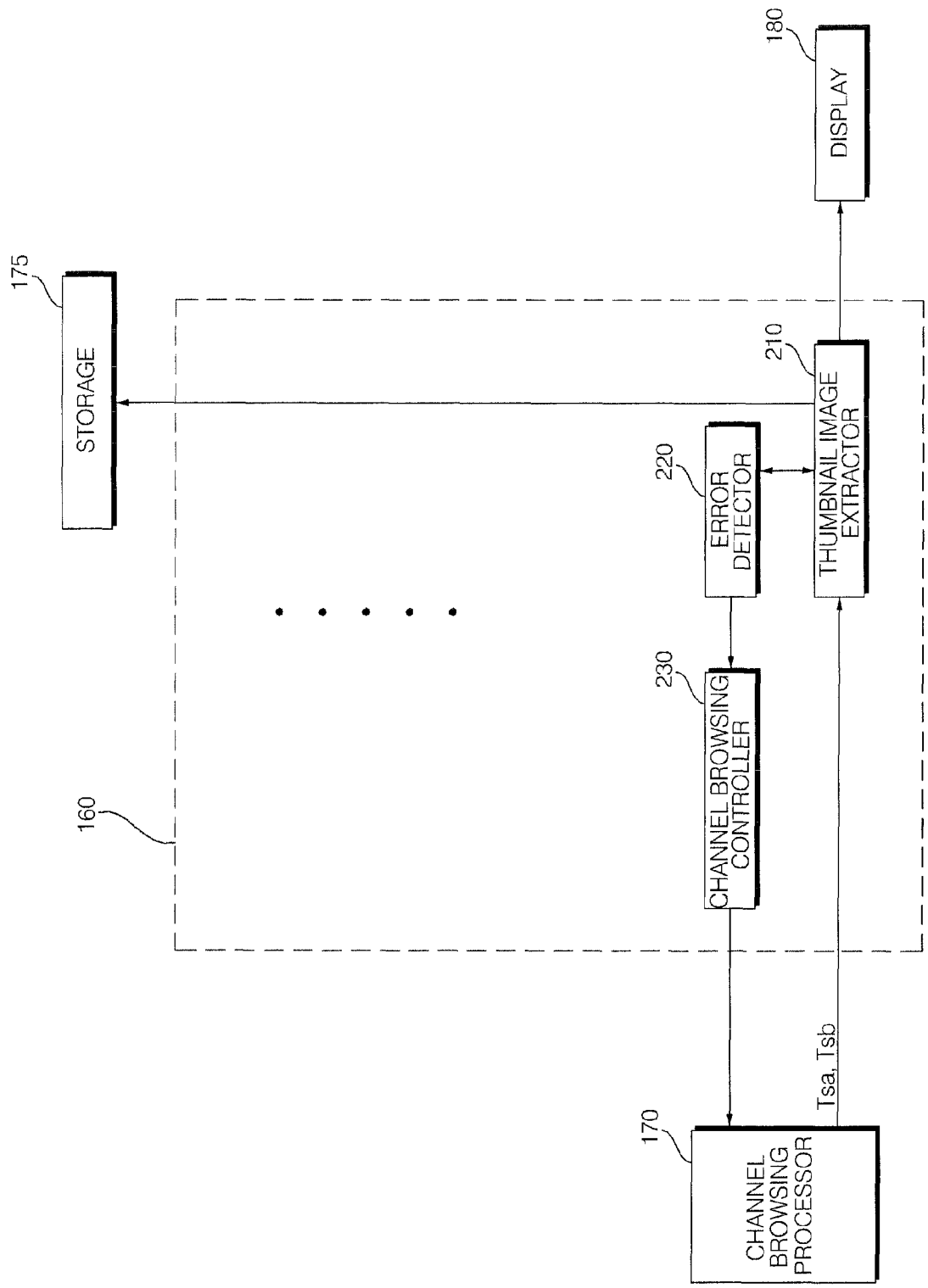

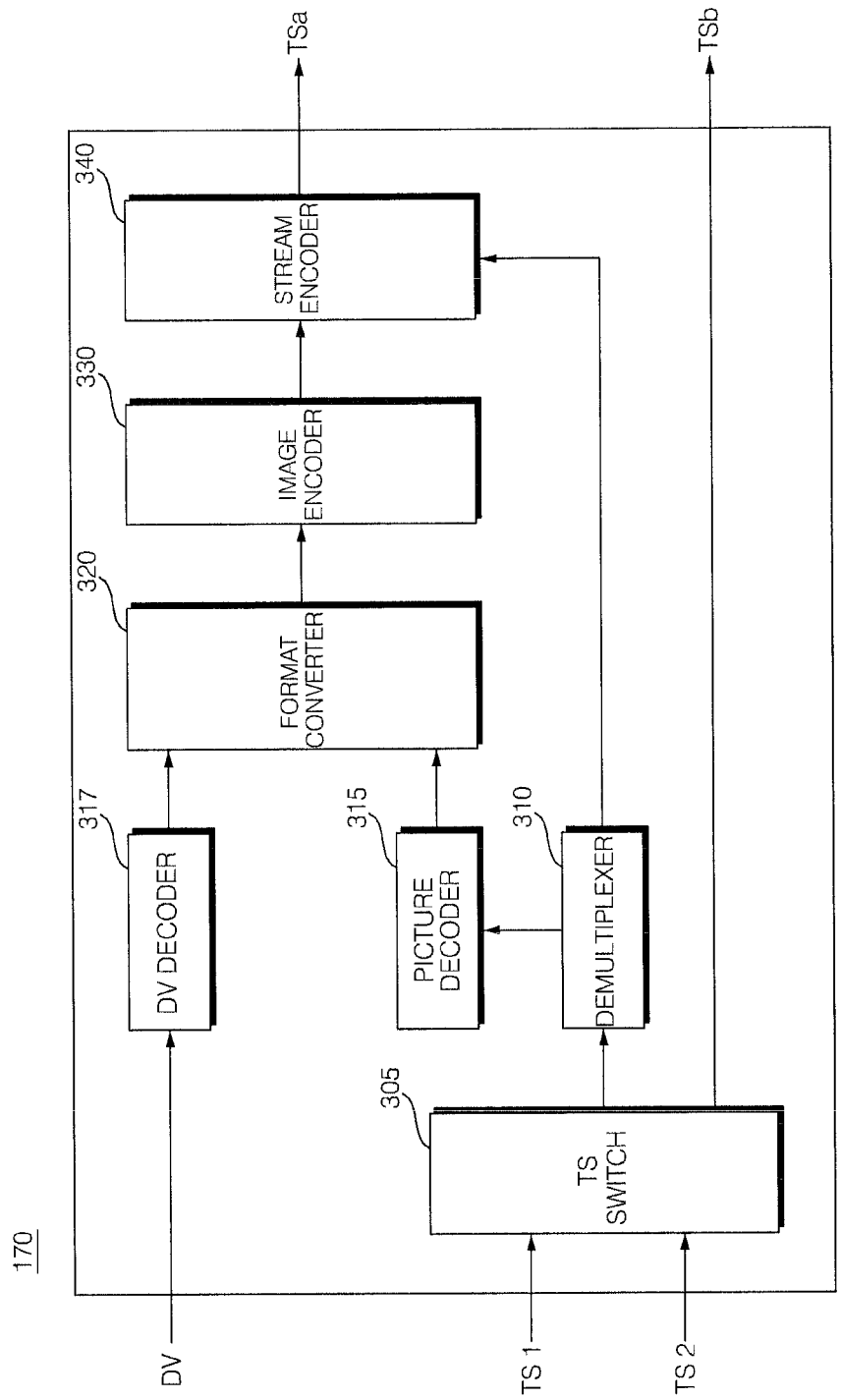

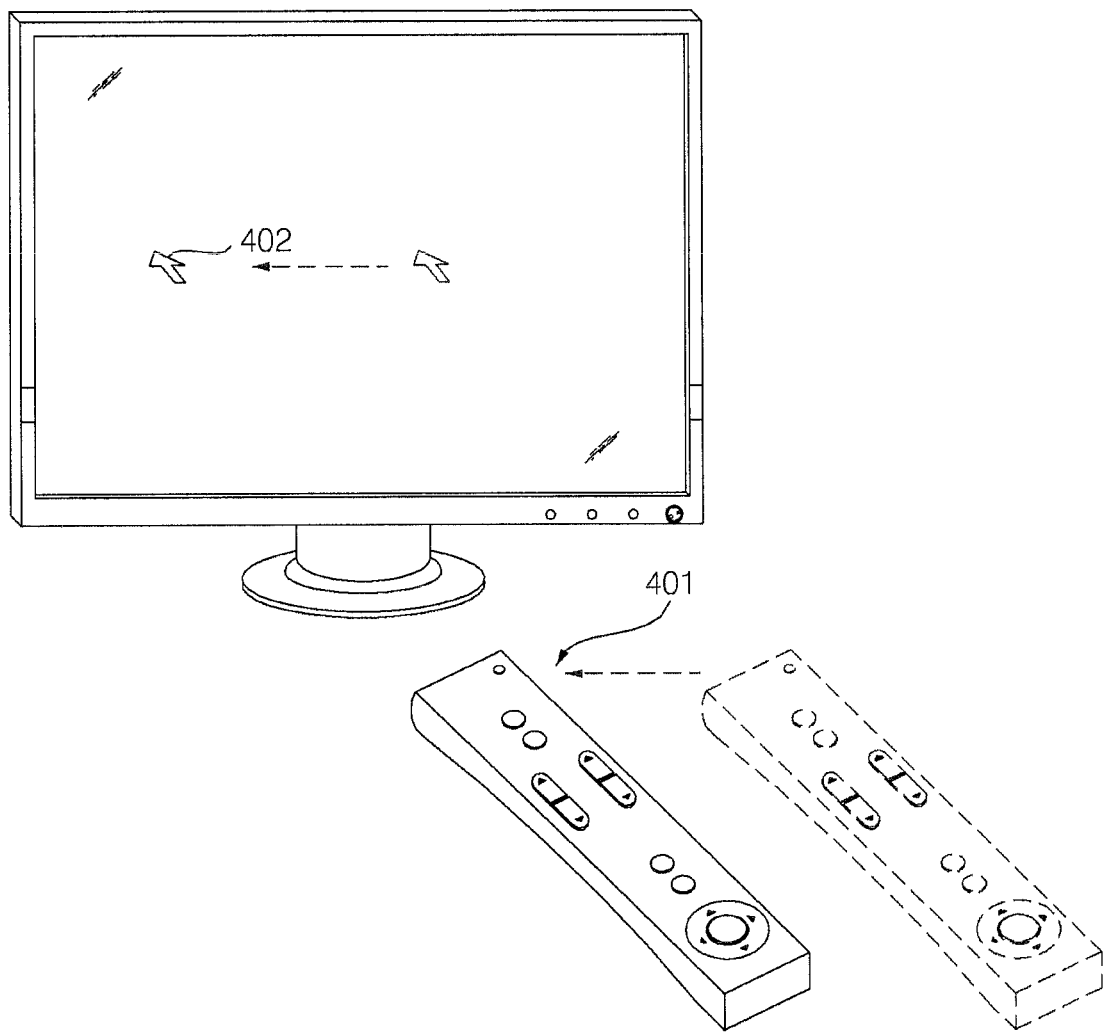

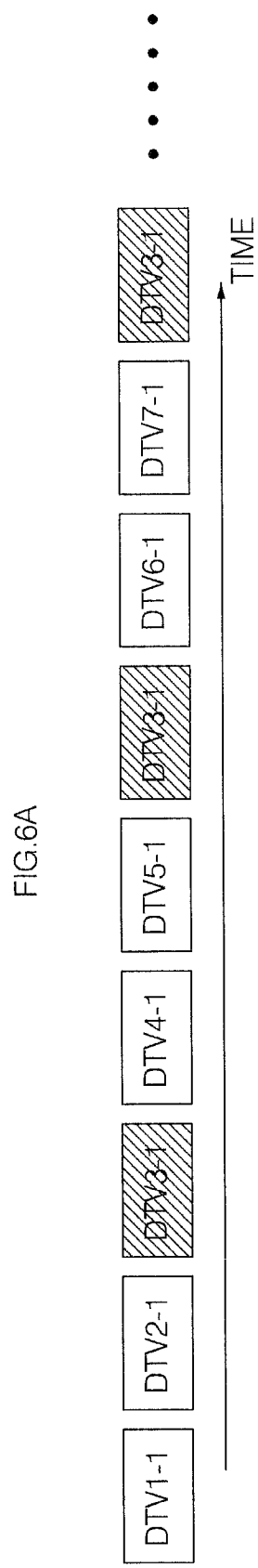

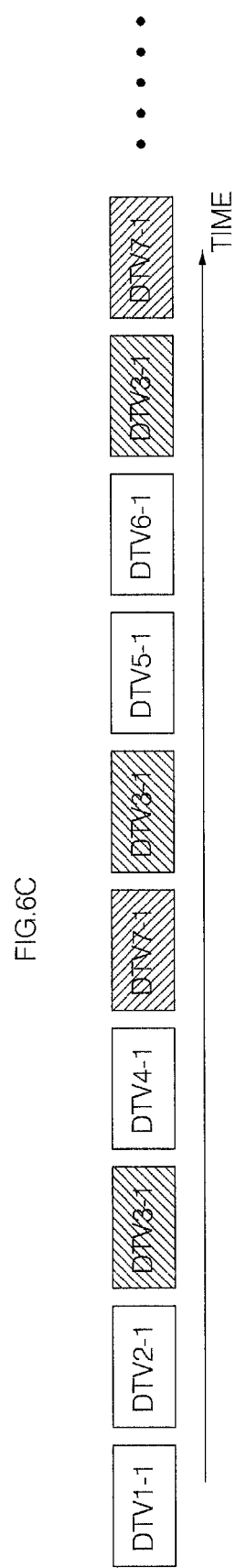

FIG.7A

DTVN-1

DTV1-1

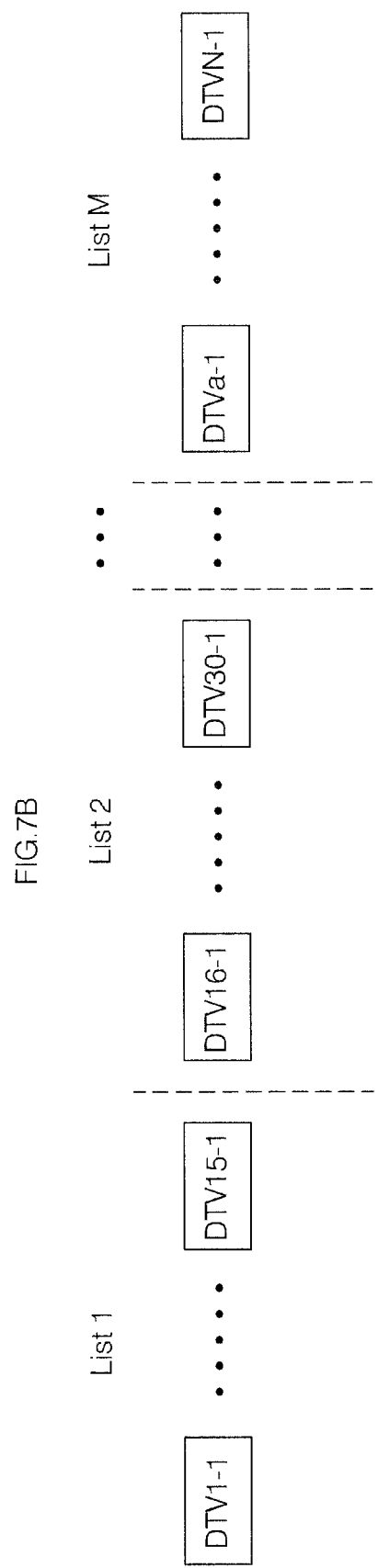

IMAGE DISPLAY APPARATUS AND OPERATING METHOD THEREFORE FOR UPDATING THUMBNAIL IMAGES IN A THUMBNAIL LIST

CROSS-REFERENCE TO RELATED APPLICATION

This application claims priority benefit from Korean Patent Application No. 2009-0084173, filed Sep. 7, 2009, the subject matter of which is incorporated herein by reference.

BACKGROUND

1. Field

Embodiments may relate to an image display apparatus and an operation method therefore. More particularly, embodiments may relate to an image display apparatus and an operation method therefore that may enable a user to easily select a channel.

2. Background

An image display apparatus may display images viewable to a user. The image display apparatus may display a broadcasting program selected by the user on a display from among broadcasting programs transmitted from broadcasting stations. A trend in broadcasting is a shift from analog broadcasting to digital broadcasting.

As it transmits digital audio and video signals, digital broadcasting may offer advantages over analog broadcasting such as robustness against noise, less data loss, ease of error correction, and/or an ability to provide high-definition, clear images. Digital broadcasting may also allow interactive services for viewers.

However, as broadcast channels increase in number to meet various user demands, it may become more difficult for viewers to determine what programs they are watching as they switch through channels. Therefore, a considerable amount of time may be taken to select a channel.

BRIEF DESCRIPTION OF THE DRAWINGS

Arrangements and embodiments may be described in detail with reference to the following drawings in which like reference numerals refer to like elements and wherein:

FIG. 2 is a block diagram of a controller shown in FIG. 1;

FIG. 3 is a block diagram of a channel browsing processor shown in FIG. 1;

FIGS. 4A and 4B are diagrams illustrating examples of a remote controller shown in FIG. 1;

FIGS. 6A to 6C are diagrams showing methods for updating broadcast signals according to exemplary embodiments of the present invention;

FIGS. 7A to 7B are diagrams showing methods for generating thumbnail images of broadcast signals according to exemplary embodiments of the present invention;

DETAILED DESCRIPTION

Exemplary arrangements and embodiments of the present invention may be described below with reference to the attached drawings.

The terms "module" and "portion" attached to describe names of components/elements may be used herein to help understanding of the components/elements and thus should not be considered as having specific meanings and/or roles. Accordingly, the terms "module" and "portion" may be interchangeable in their use.

For ease of discussion, embodiments and arrangements may be described with respect to broadcast signals. Embodiments are also applicable to other types of television signals. For example, embodiments may be applicable to cable signals, satellite signals and/or any type of received signal from a content provider or a cable provider, for example.

Figure 1:
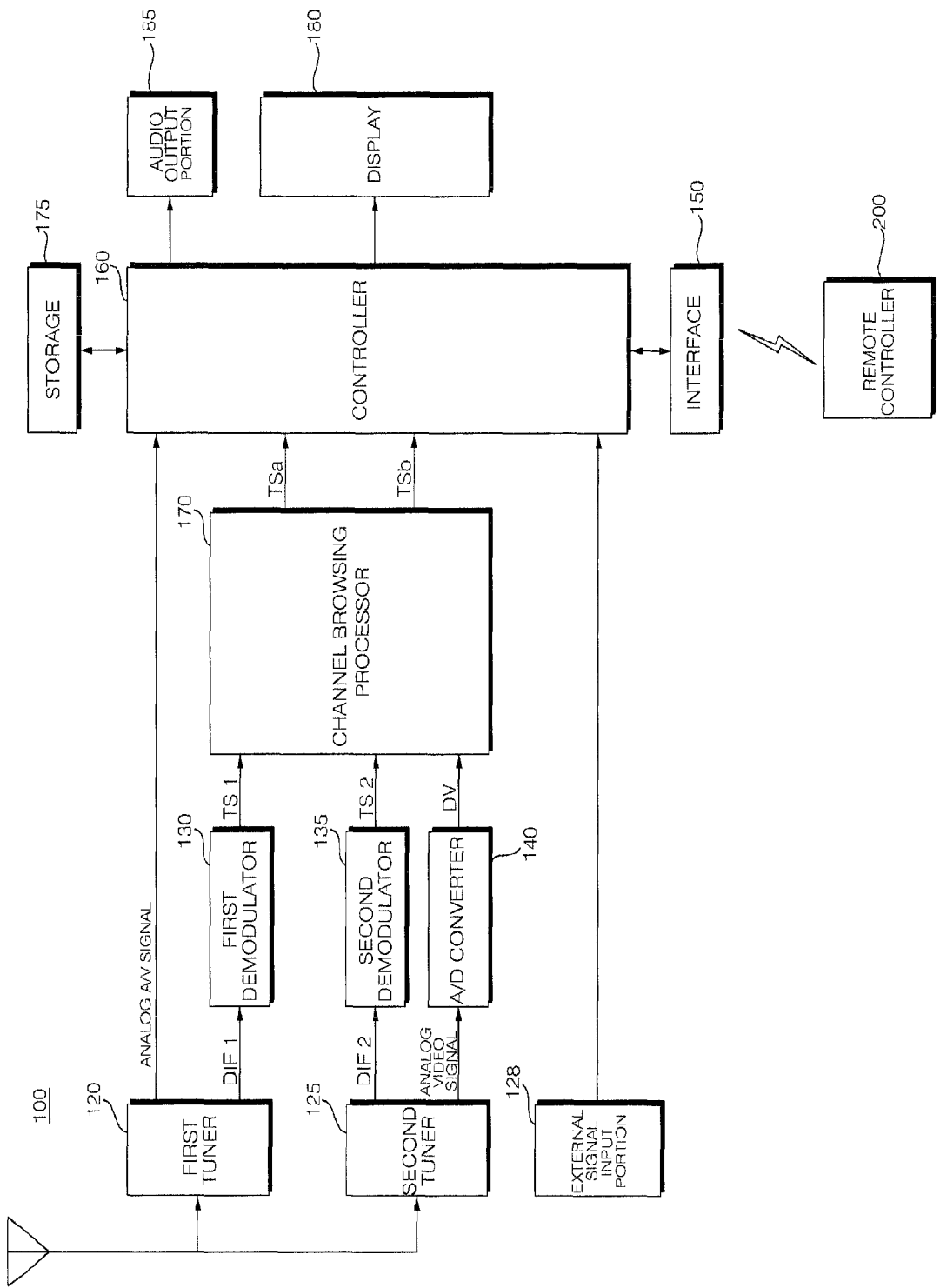
FIG. 1 is a block diagram of an image display apparatus according to an exemplary embodiment of the present invention.

FIG. 1 is a block diagram of an image display apparatus according to an example embodiment of the present invention. Other embodiments and configurations are also within the scope of the present invention.

As shown in FIG. 1, an image display apparatus 100 may include a first tuner 120, a second tuner 125, an external signal input portion 128, a first demodulator 130, a second demodulator 135, an Analog-to-Digital (A/D) converter 140, an interface 150, a controller 160, a channel browsing processor 170, a storage 175 (or memory), a display 180, and an audio output portion 185.

The first tuner 120 may select a Radio Frequency (RF) broadcast signal corresponding to a channel selected by a user from among a plurality of RF broadcast signals received through an antenna and downconvert the selected RF broadcast signal to a digital Intermediate Frequency (IF) signal or an analog baseband Audio/Video (NV) signal. More specifically, if the selected RF broadcast signal is a digital broadcast signal, the first tuner 120 may downconvert the selected RF broadcast signal to a digital IF signal DIF 1. On the other hand, if the selected RF broadcast signal is an analog broadcast signal, the first tuner 120 may downconvert the selected RF broadcast signal to an analog baseband A/V signal CVBS 1/SIF. The first tuner 120 may be a hybrid tuner capable of processing not only digital broadcast signals but also analog broadcast signals. The analog baseband A/V signal CVBS1/SIF may be directly input to the controller 160.

The first tuner 120 may receive RF broadcast signals from an Advanced Television Systems Committee (ATSC) single-carrier system or from a Digital Video Broadcasting (DVB) multi-carrier system, as may be described below.

The second tuner 125, like the first tuner 120, may select the RF broadcast signal corresponding to the channel selected by the user from among the plurality of RF broadcast signals received through the antenna, and may downconvert the selected RF broadcast signal to a second digital IF signal DIF 2 or an analog baseband A/V signal CVBS 2/SIF.

The second tuner 125 may sequentially or periodically select a number of RF broadcast signals corresponding to a number of broadcast channels previously added to the image display apparatus 100 by a channel add function from a plurality of RF signals received through the antenna, and may downconvert the selected RF broadcast signals to IF signals or baseband A/V signals. One or more video frames acquired from each of the previously-added channels may be displayed on at least a part of the display 180 as a thumbnail image. Thus, the RF broadcast signals corresponding to all of the previously-added channels may be sequentially or periodically received.

For example, the first tuner 120 may downconvert a main RF broadcast signal selected by the user to an IF signal or a baseband A/V signal, and the second tuner 125 may sequentially or periodically select all RF broadcast signals or all other RF broadcast signals (i.e., sub-RF broadcast signals) except for the main RE broadcast signal and downconvert the selected RF broadcast signals to IF signals or baseband A/V signals.

The first demodulator 130 may receive the first digital IF signal DIF 1 from the first tuner 120 and may demodulate the first digital IF signal DIF 1.

For example, if the first digital IF signal DIF 1 is an ATSC signal, the first demodulator 130 may perform 8-Vestigal SideBand (VSB) demodulation on the first digital IF signal DIF 1. The first demodulator 130 may also perform channel decoding. For the channel decoding, the first demodulator 130 may include a Trellis decoder (not shown), a de-interleaver (not shown) and a Reed-Solomon decoder (not shown) and/or may perform Trellis decoding, de-interleaving and Reed-Solomon decoding.

For example, if the first digital IF signal DIF 1 is a DVB signal, the first demodulator 130 may perform Coded Orthogonal Frequency Division Multiple Access (COFDMA) demodulation on the first digital IF signal DIF 1. The first demodulator 130 may also perform channel decoding. For the channel decoding, the first demodulator 130 may include a convolution decoder (not shown), a de-interleaver (not shown), and a Reed-Solomon decoder (not shown), and/or may perform convolution decoding, de-interleaving, and Reed-Solomon decoding.

The external signal input portion 128 may receive signals from an external device (or external input device). For reception of the external input signals, the external signal input portion 128 may include an A/V Input/Output (I/O) module (not shown) and/or a wireless communication module (not shown).

The external signal input portion 128 may be connected to an external device such as a Digital Versatile Disc (DVD), a BLURAY® disc, a gaming device, a camcorder, and/or a computer (e.g., a laptop computer). The external signal input portion 128 may externally receive video, audio, and/or data signals from the external device and transmit the received external input signals to the controller 160. The external signal input portion 128 may output video, audio, and/or data signals processed by the controller 160 to the external device.

In order to receive or transmit A/V signals from or to the external device, the A/V I/O module of the external signal input portion 128 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and/or a LiquidHD port.

Various input signals received through the external signal input portion 128 may be input to the channel browsing processor 170 and may be subjected to a channel browsing operation performed by the channel browsing processor 170 for extracting a number of thumbnail images. For example, analog signals received through the CVBS port and the S-video port may be converted into digital signals by the A/D converter 140 and then input to the channel browsing processor 170. Digital signals received through the Ethernet port, the USB port, the component port, the DVI port, the HDMI port, the RGB port, the D-sub port, the IEEE-1394 port, the S/PDIF port and the LiquidHD port may be directly input to the channel browsing processor 170 without the need for A/D conversion. A digital signal output from the external signal input portion 128 may be a stream signal, for example, an MPEG-2 Transport Stream (TS) in which an MPEG-2 video signal and a Dolby AC-3 audio signal are multiplexed.

The wireless communication module of the external signal input portion 128 may wirelessly access the Internet. For the wireless Internet access, the wireless communication module may use a Wireless Local Area Network (WLAN) (i.e., Wi-Fi), Wireless Broadband (WIBRO®), World Interoperability for Microwave Access (WIMaX®), and/or High Speed Downlink Packet Access (HSDPA).

The wireless communication module may perform short-range wireless communication with other electronic devices. For the short-range wireless communication, the wireless communication module may use BLUETOOTH®, Radio-Frequency IDentification (RFID), Infrared Data Association (IrDA), Ultra WideBand (UWB), and/or ZIGBEE®.

The wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and/or ZigBee.

The external signal input portion 128 may be connected to one of various set-top boxes through at least one of the Ethernet port, the USB port, the CVBS port, the component port, the S-video port, the DVI port, the HDMI port, the RGB port, the D-sub port, the IEEE-1394 port, the S/PDIF port, and/or the liquid HD port and may thus receive data from or transmit data to the various set-top boxes. For example, when connected to an Internet Protocol Television (IPTV) set-top box, the external signal input portion 128 may transmit video, audio and/or data signals processed by the IPTV set-top box to the controller 160 and may transmit various signals received from the controller 160 to the IPTV set-top box. Video, audio and/or data signals processed by the IPTV set-top box may be processed by the channel browsing processor 170 and the controller 160.

The term 'IPTV' as used herein may cover a broad range of services, depending on transmission networks, such as ADSL-TV, VDSL-TV, FTTH-TV, TV over DSL, Video over DSL, TV over IP (TVIP), Broadband TV (BTV), and Internet TV and full-browsing TV, which are capable of providing Internet-access services.

The first demodulator 130 may perform demodulation and channel decoding on the first digital IF signal DIF 1 received from the first tuner 120, thereby obtaining a first stream signal TS 1. The first stream signal TS 1 may be a signal in which a video signal, an audio signal and a data signal are multiplexed. For example, the first stream signal TS 1 may be an MPEG-2 TS signal obtained by multiplexing an MPEG-2 video signal and a Dolby AC-3 audio signal. An MPEG-2 TS signal may include a 4-byte header and a 184-byte payload.

The first stream signal TS 1 may be input to the controller 160 and may thus be subjected to demultiplexing and signal processing. The first stream signal TS 1 may be input to the channel browsing processor 170 and may thus be subjected to a channel browsing operation prior to input to the controller 160. The channel browsing operation may be described below in further detail.

In order to properly handle not only ATSC signals but also DVB signals, the first demodulator 130 may include an ATSC demodulator and a DVB demodulator.

The second demodulator 135 may receive the second digital IF signal DIF 2 from the second tuner 125 and may demodulate the second digital IF signal DIF 2, thereby generating a second stream signal TS 2. Operation of the second demodulator 135 may be almost the same as operation of the first demodulator 130.

An analog baseband video signal CVBS 2 output from the second tuner 125 may need to be digitized by the A/D converter 140.

The A/D converter 140 may convert a received analog signal to a digital signal. If the received analog signal is a video signal, the A/D converter 140 may perform sampling and quantization on the analog signal, thereby obtaining the digital video signal DV. The digital video signal DV may be a signal yet to be encoded. The digital video signal DV may be provided to the channel browsing processor 170 for processing.

The interface 150 may transmit a signal received from the user to the controller 160 or may transmit a signal received from the controller 160 to the user. For example, the interface 150 may receive various user input signals such as a power-on/off signal, a channel selection signal, and/or a screen setting signal from a remote controller 200 (or a pointing device) and/or may transmit a signal received from the controller 160 to the remote controller 200 (or the pointing device).

The controller 160 may demultiplex an input stream signal into a number of signals and process the demultiplexed signals so that the processed signals can be output as A/V data. The controller 160 may provide overall control to the image display apparatus 100.

The controller 160 may include a demultiplexer (not shown), a video processor (not shown), an audio processor (not shown), and/or a user input processor (not shown).

The controller 160 may demultiplex an input stream signal (e.g. an MPEG-2 TS signal) into a video signal, an audio signal and/or a data signal.

The controller 160 may process the video signal. For example, if the video signal is an encoded signal, the controller 160 may decode the video signal. More specifically, if the video signal is an MPEG-2 encoded signal, the controller 160 may decode the video signal by MPEG-2 decoding. On the other hand, if the video signal is an H.264-encoded DMB or a DVB-handheld (DVB-H) signal, the controller 160 may decode the video signal by H.264 decoding.

The controller 160 may adjust brightness, tint and/or color of the video signal.

The video signal processed by the controller 160 may be displayed on the display 180. Alternatively, the video signal processed by the controller 160 may be output to an external output port connected to an external device (or external output device).

The controller 160 may process the audio signal obtained by demultiplexing the input stream signal. For example, if the audio signal is an encoded signal, the controller 160 may decode the audio signal. More specifically, if the audio signal is an MPEG-2 encoded signal, the controller 160 may decode the audio signal by MPEG-2 decoding. If the audio signal is an MPEG-4 Bit Sliced Arithmetic Coding (BSAC)-encoded terrestrial DMB signal, the controller 160 may decode the audio signal by MPEG-4 decoding. On the other hand, if the audio signal is an MPEG-2 Advanced Audio Coding (AAC)-encoded DMB or DVB-H signal, the controller 180 may decode the audio signal by AAC decoding.

The controller 160 may adjust base, treble or sound volume of the audio signal.

The audio signal processed by the controller 160 may be output to the audio output portion 185 (e.g., a speaker). Alternatively, the audio signal processed by the controller 160 may be output to an external output port connected to an external device (or external output device).

The controller 160 may process the data signal obtained by demultiplexing the input stream signal. For example, if the data signal is an encoded signal such as an Electronic Program Guide (EPG), which is a guide to scheduled broadcast TV or radio programs, the controller 160 may decode the data signal. Examples of an EPG include ATSC-Program and System Information Protocol (PSIP) information and DVB-Service Information (SI). ATSC-PSIP information or DVB-SI information may be included in a header of a TS (i.e., a 4-byte header of an MPEG-2 TS).

The controller 160 may perform On-Screen Display (OSD) processing. More specifically, the controller 160 may generate an OSD signal for displaying various pieces of information on the display 180, such as graphic or text data, based on a user input signal received from the remote controller 200 and at least one of a processed video signal and/or a processed data signal. The OSD signal may be input to the display 180 along with the processed video and data signals.

The OSD signal may include various data such as a User-Interface (UI) screen, various menu screens, widgets, and/or icons for the image display apparatus 100.

The channel browsing processor 170 may perform channel browsing on at least one of a plurality of broadcast signals corresponding to a plurality of received channels, various input image signals received from the external signal input portion 128, and/or both. More specifically, the channel browsing processor 170 may receive the first or second stream signal TS 1 or TS 2 from the first or second demodulator 130 or 135, a stream signal from the external signal input portion 128, or the digital signal DV from the A/D converter 140, demultiplex the first or second stream signal TS 1 or TS 2, and extract some of the frames of a video signal obtained by the demultiplexing. Thereafter, the channel browsing processor 170 may generate a new TS signal (i.e., a sub-stream signal TSa) by multiplexing a video signal including the extracted video frames. For example, the sub-stream signal TSa and a main-stream signal TSb may both be MPEG-2 TS signals.

The channel browsing processor 170 may output the main-stream signal TSb, which may correspond to a main video signal to be displayed in a main region of the display 180, without any processing. On the other hand, the channel browsing processor 170 may perform channel browsing on a sub-video signal that is to be displayed in a sub-region of the display 180, thereby obtaining the sub-stream signal TSa.

The channel browsing processor 170 may extract some of the video frames of each of a plurality of broadcast signals (or television signals) received through a plurality of channels and re-encode the extracted video frames into a TS, thereby displaying a list of the channels on the display 180. Since the extracted video frames are displayed on the display 180 as thumbnail images, the user may intuitively identify contents of broadcast programs received through the plurality of channels.

The channel browsing processor 170 may extract some of the video frames of each of various external input signals received from the external signal input portion 128 and re-encode the extracted video frames into a stream, thereby displaying an external image list (or external input image list) on the display 180. In this manner, a list of a plurality of external image signals received from a plurality of external devices may be displayed on the display 180 as thumbnail images. Therefore, the user may intuitively identify the external signals received from the external devices based on the external image list.

The channel browsing processor 170 may extract some of the video frames of each of a plurality of broadcast signals (or television signals) received through a plurality of channels and some of the video frames of each of various external input signals received from the external signal input portion 128 and re-encode the extracted video frames into TSs, thereby displaying a channel list and an external input image list on the display 180. Since the extracted video frames are displayed on the display 180 as thumbnail images, the user may intuitively identify contents of broadcast programs received through the plurality of channels and the external input signals received from the external devices.

Structure and operation of the channel browsing processor 170 may be further described below with reference to FIG. 3.

The storage 175 may store various programs for processing and controlling signals by the controller 160, and the storage 175 may also store processed video, audio and/or data signals.

The storage 175 may temporarily store a video, audio and/or data signal received from the external signal input portion 128.

The storage 175 may include, for example, at least one of a flash memory-type storage medium, a hard disc-type storage medium, a multimedia card micro-type storage medium, a card-type memory, a Random Access Memory (RAM) and/or a Read-Only Memory (ROM) such as an Electrically Erasable Programmable ROM (EEPROM).

While FIG. 1 shows the storage 175 configured separately from the controller 160, embodiments of the present invention are not so limited to this structure. For example, the storage 175 may be incorporated into the controller 160.

The image display apparatus 100 may play a file (such as a moving picture file, a still image file, a music file, and/or a text file) stored in the storage 175 to the user.

The display 180 may convert a processed video signal, a processed data signal, and an OSD signal received from the controller 160 or a video signal and a data signal received from the external signal input portion 128 to RGB signals, thereby generating driving signals. The display 180 may be implemented as one of various types of displays such as a Plasma Display Panel (PDP), a Liquid Crystal Display (LCD), an Organic Light-Emitting Diode (OLED), a flexible display, and/or a three-dimensional (3D) display. The display 180 may also be implemented as a touch screen so that it is used not only as an output device but also as an input device.

The audio output portion 185 may receive a processed audio signal (e.g., a stereo signal, a 3.1-channel signal or a 5.1-channel signal) from the controller 160 and may output the received audio signal as voice. The audio output portion 185 may be implemented to include one of various types of speakers.

The remote controller 200 may transmit a user input to the interface 150. For the transmission of a user input, the remote controller 200 may use any one of various communication techniques, such as BLUETOOTH®, RF, IR, UWB and/or ZIGBEE®.

The remote controller 200 may receive a video signal, an audio signal and/or a data signal from the interface 150 and may output the received signals.

The remote controller 200 may be a pointing device, for example. A pointing device may be described below in further detail with reference to FIG. 3.

The image display apparatus 100 may be a fixed digital broadcast receiver capable of receiving at least one of ATSC (8-VSB) broadcast programs, DVB-T (COFDM) broadcast programs, and/or ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and/or Media Forward Link Only (MediaFLO) broadcast programs. Alternatively, the image display apparatus 100 may be a digital broadcast receiver capable of receiving cable broadcast programs, satellite broadcast programs or IPTV programs.

Examples of the image display apparatus 100 may include a TV receiver, a mobile phone, a smart phone, a laptop computer, a digital broadcast receiver, a Personal Digital Assistant (PDA) and/or a Portable Multimedia Player (PMP).

Television signals that are received by any of the components of FIG. 1 may include broadcast signals, a cable signal for a set top box and/or any type of received signal from a content provider or a cable provider, for example.

FIG. 2 is a block diagram of the controller 160 shown in FIG. 1.

As shown in FIG. 2, the controller 160 may include a thumbnail image extractor 210, an error detector 220 and a channel browsing controller 230. The controller 160 may further include a video signal processor (not shown) and an audio signal processor (not shown).

An error may occur in a thumbnail image processed by the channel browsing processor 170, for example, during transmission of the thumbnail image to the controller 160. Therefore, it may be necessary to stably process thumbnail images.

The thumbnail image extractor 210 may extract a thumbnail image corresponding to an input signal. For example, if the channel browsing processor 170 extracts a primitive thumbnail image corresponding to an input signal, encodes the primitive thumbnail image to a thumbnail stream, and transmits the thumbnail stream to the controller 160, the thumbnail image extractor 210 may extract a thumbnail image from the thumbnail stream. The thumbnail image extractor 210 may demultiplex the thumbnail stream. The thumbnail image extractor 210 may also extract part of the thumbnail image by parsing the demultiplexed thumbnail stream.

The input signal may include at least one of a broadcast image signal received on a channel and an external input signal received from an external device.

The thumbnail image extractor 210 may create a thumbnail list of extracted thumbnail images and control the thumbnail list to be displayed on the display 180.

The thumbnail image extractor 210 may also create a thumbnail list having updated thumbnail images.

The thumbnail image extractor 210 may also manage a database. For example, the thumbnail image extractor 210 may organize individual databases for terrestrial broadcast signals, cable broadcast signals, digital broadcast signals, analog broadcast signals, and/or external input signals. The thumbnail image extractor 210 may execute various functions including addition, deletion, modification, and/or search of thumbnail images.

The error detector 220 may check errors in the extracted thumbnail image received from the thumbnail image extractor 210. An erroneous thumbnail image may be displayed broken (or in an improper manner) on the display 180. To address this problem, the error detector 220 may examine at least one of size information, syntax information, checksum information, continuity information and/or content information of the extracted thumbnail image.

If the thumbnail-image extractor 210 extracts a thumbnail image on a packet basis, the error detector 220 may examine size information, syntax information, checksum information, continuity information and/or content information of the thumbnail image of each packet received from the thumbnail-image extractor 210. If thumbnail images are extracted from a plurality of consecutive packets, continuity between the extracted thumbnail images may be examined by examining information indicating a sequence of the consecutive packets, for example, packet sequence bits of the extracted thumbnail images.

In order to examine content information of the extracted thumbnail image, the error detector 220 may temporarily decode at least part of the extracted thumbnail image and determine whether the decoded thumbnail image is erroneous.

If the extracted thumbnail image turns out good as a result of the error check, the error detector 220 may transmit a control signal to the thumbnail image extractor 210 and may control a thumbnail image screen including the extracted thumbnail image to be displayed on the display 180.

If the extracted thumbnail image turns out bad as a result of the error check, the error detector 220 may control the channel browsing processor 230 or the thumbnail image extractor 210 to discontinue updating of the extracted thumbnail image or extraction of a new thumbnail mage by transmitting a control signal. The error detector 220 may also control the erroneous thumbnail image to be deleted from the thumbnail list.

The channel browsing controller 230 may control the channel browsing processor 170 to operate in response to a user command received via the interface 150. For example, if a channel list display command to display a thumbnail image screen is issued, the channel browsing controller 230 may control the channel browsing processor 170 to acquire a thumbnail image corresponding to a broadcast image signal received on a channel.

The channel browsing controller 230 may control the channel browsing processor 170 to operate. The thumbnail image extractor 210 may generate a thumbnail list of thumbnail images including updated thumbnail images.

The channel browsing controller 230 may control the channel browsing processor 170 to update thumbnail images. The channel browsing controller 230 may set an update period of a thumbnail image displayed on the display 180 to be different from the update period of another thumbnail image. For this purpose, the channel browsing controller 230 may control operations of the first and second tuners 120 and 125 and the first and second demodulators 130 and 135.

For example, when there is a focused thumbnail image, a thumbnail image corresponding to a broadcast signal of a channel that has started a new program, a thumbnail image corresponding to a broadcast signal of a channel that has ended an on-going program, and/or a thumbnail image corresponding to a latest connected external device from among the thumbnail images displayed on the display 180, the channel browsing controller 230 may set the update period of the focused thumbnail image, the thumbnail image corresponding to the starting channel, the thumbnail image corresponding to the ending channel, and the thumbnail image corresponding to the latest connected external device to be shorter than the update period of another thumbnail image by controlling associated modules. Therefore, the user may easily select an input image and may have increased convenience for channel selection.

The channel browsing controller 230 may also set the update period of a thumbnail image corresponding to a channel registered as preferred to be different from the update period of another thumbnail image from among the thumbnail images displayed on the display 180. For example, the update period of the former may be set to be shorter than the update period of the latter in order to catch the user's eye.

The channel browsing controller 230 may set a different update period for a thumbnail image from the update period of another thumbnail image according to a selection frequency, a viewing time, and/or a popularity ranking of a channel corresponding to the thumbnail image. The update period of the thumbnail image of interest may be set shorter than that of another thumbnail image in order to catch the user's eye.

For example, the channel browsing controller 230 may control only a thumbnail image corresponding to a broadcast signal of a channel that has started a new program to be updated, while the other thumbnail images are kept not updated. Accordingly, the user may easily grasp contents of the new program on the channel based on the thumbnail image.

Regarding a focused thumbnail image from among the thumbnail images displayed on the display 180, the channel browsing controller 230 may update only the other thumbnail images except for the focused thumbnail image by controlling associated modules. Therefore, the user may mainly view a thumbnail image of interest from among a plurality of thumbnail images.

It may further be contemplated that the channel browsing controller 230 may control only a thumbnail image corresponding to a broadcast signal of a channel that has ended an on-going program to be updated while the other thumbnail images are kept not updated. Accordingly, the user may easily grasp contents of the program following the ending program on the channel by the thumbnail image.

The channel browsing controller 230 may also update only a thumbnail image corresponding to the latest connected external device while thumbnail images corresponding to the other external devices are kept not updated. Accordingly, the user may easily recognize an external input image received from the latest connected external device.

If the error detector 220 detects an error in a thumbnail image, the channel browsing controller 230 may terminate updating of the thumbnail image in the channel browsing processor 170.

The channel browsing controller 230 may control modules including the channel browsing processor 170 to receive broadcast signals on all broadcast channels stored preliminarily in the storage 175 and may generate thumbnail images of the broadcast signals.

The channel browsing controller 230 may control such that broadcast signals are received on a predetermined number of broadcast channels, not all broadcast channels, and thumbnail images may be generated from the received broadcast signals. The predetermined number of broadcast channels may be equal to the number the thumbnail images listed in the thumbnail list and the thumbnail list may be a latest thumbnail list displayed on the display 180. While not shown in FIG. 2, the channel browsing controller 230 may control a thumbnail list including one or more thumbnail images acquired by the thumbnail image extractor 210 to be displayed on the display 180.

The storage 175 may store one or more thumbnail images acquired by the thumbnail image extractor 210. The thumbnail images stored in the storage 175 may be displayed on the display 180 in response to a channel list display command received via the interface 150.

While the thumbnail image extractor 210, the error detector 220, and the channel browsing controller 230 are shown in FIG. 2 as being included in the controller 160, they may also be implemented as separate modules from the controller 160 or two or more of them may be incorporated into one module.

FIG. 3 is a block diagram of the channel browsing processor 170 shown in FIG. 1. Other embodiments and configurations may also be provided.

As shown in FIG. 3, the channel browsing processor 170 may include a TS switch 305, a demultiplexer 310, a picture decoder 315, a DV decoder 317, a format converter 320, an image encoder 330 (or a video encoder) and a stream encoder 340.

The TS switch 305 may select one of the first stream signal TS 1 or the second stream signal TS 2, may output the selected stream signal as the main-stream signal TSb without any processing, and may transmit the other stream signal to the demultiplexer 310 as a sub-stream signal. The main-stream signal, which may correspond to a main video signal, may be displayed on almost an entire area of the display 180. The sub-stream signal, which may correspond to a sub-video signal, may be displayed only on a particular part of the display 180.

A channel list, an external input image list and/or both may be displayed in a compact-view mode in a particular area on the display 180.

The demultiplexer 310 may demultiplex the first stream signal TS 1 or the second stream signal TS 2 into a video signal, an audio signal and/or a data signal, output the video signal to the picture decoder 315, and output the audio signal and the data signal to the stream encoder 340 in order for the stream encoder 340 to generate a new stream signal.

The picture decoder 315 may decode at least some of the frames of the received video signal by MPEG-2 decoding, MPEG-4 decoding and/or H.264 decoding. The decoded frames may be still images and/or moving pictures. For example, the picture decoder 315 may decode an Intra-coded (I) frame or some section of the received video signal.

The DV decoder 317 may receive the digital signal DV from the A/D converter 140 and may acquire a digital image signal from the digital signal DV.

The format converter 320 may convert the format of a video signal received from the picture decoder 315 and/or the DV decoder 317. For example, the format converter 320 may change a size (or resolution) of the input image signal. The size change may depend on a number of thumbnail images in a thumbnail list displayed on the display 180. For example, as the number of thumbnail images increases, the size of the thumbnail images may decrease.

The format converter 320 may convert the input image signal to a different size according to whether the input image signal is to be displayed in a compact-view mode or in a full-view mode. The size of thumbnail images displayed in the full-view mode may be greater than the size of thumbnail images displayed in the compact-view mode. A channel list, an external image list (or external input image list) and/or both may be displayed on the display 180 either in the compact-view mode or in the full-view mode.

The image encoder 330 may encode the image signal received from the format converter 320 by JPEG encoding or MPEG-2 encoding. Still images or moving pictures encoded by the image encoder 330 may be displayed on the display 180 as thumbnail images.

The stream encoder 340 may re-encode or multiplex an encoded video signal received from the image encoder 330 and the audio and data signals obtained by the demultiplexing performed in the demultiplexer 310 into a stream, for example, an MPEG-2 TS.

The channel browsing processor 170 may extract some of the video frames of each of a plurality of broadcast signals (or television signals) and a plurality of external input signals and re-encode the extracted video frames. The re-encoded images may be displayed on the display 180 as thumbnail images in response to a user input requesting the display of a channel list or an external input image list. The user may intuitively identify contents of broadcast programs received from various channels or external input signals provided by various external devices.

Figure 4A:
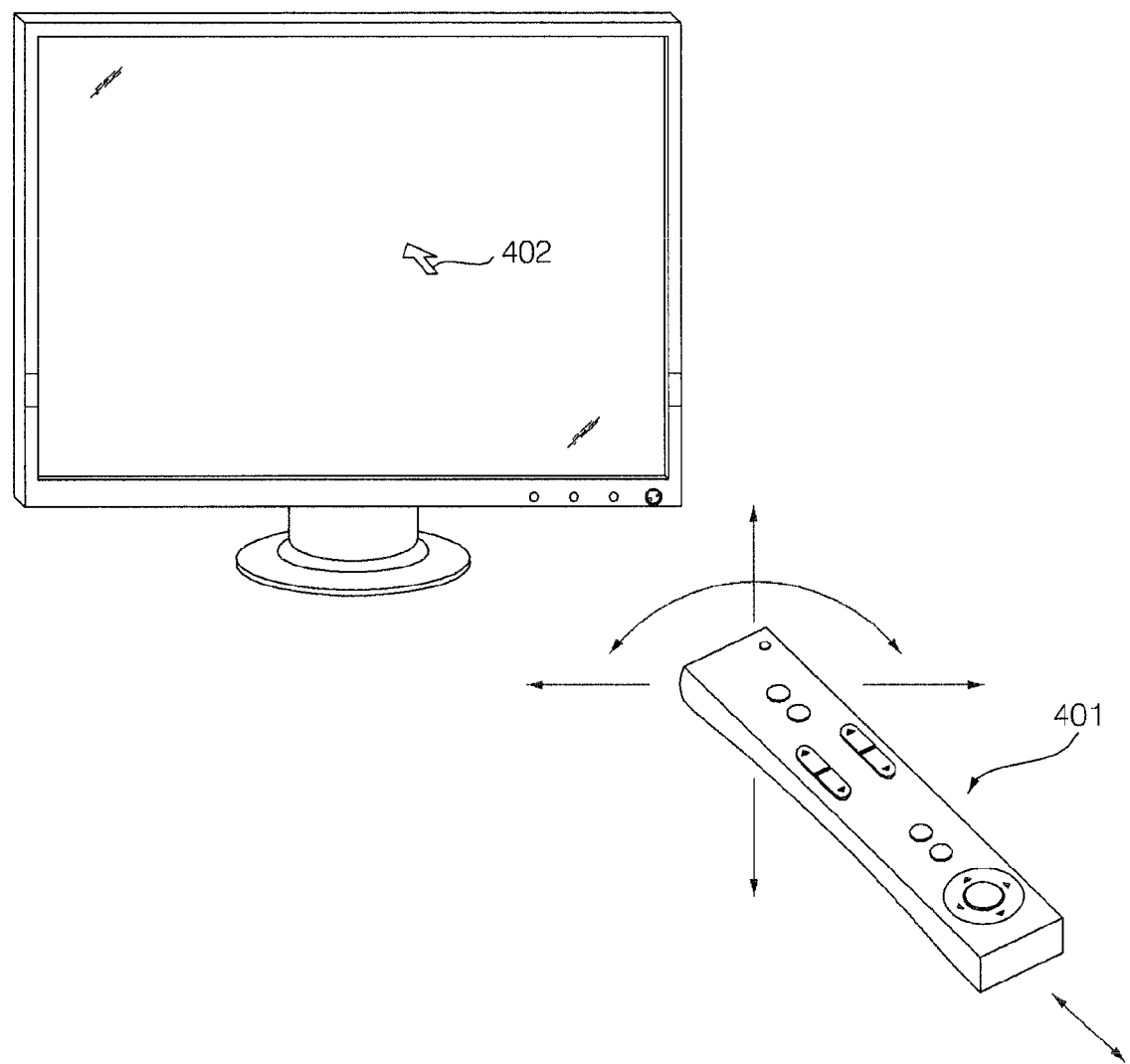

FIGS. 4A and 4B illustrate examples of the remote controller 200 (or pointing device) shown in FIG. 1.

As shown in FIGS. 4A and 4B, the remote controller 200 may be a pointing device 401. The pointing device 401 may transmit or receive RF signals to or from the image display apparatus 100 according to an RF communication standard. As shown in FIG. 4A, a pointer 402 representing movement of the pointing device 401 may be displayed on the image display apparatus 100.

The user may move the pointing device 401 up and down, back and forth, and side to side or may rotate (or move) the pointing device 401. The pointer 402 may move in accordance with movement of the pointing device 401, as shown in FIG. 4B.

As shown in FIG. 4A, if the user moves the pointing device 401 to the left, the pointer 402 may move to the left accordingly. The pointing device 401 may include a sensor capable of detecting motions. The sensor of the pointing device 401 may detect movement of the pointing device 401 and may transmit motion information corresponding to a result of the detection to the image display apparatus 100. The image display apparatus 100 may determine movement of the pointing device 401 based on the motion information received from the pointing device 401, and may calculate coordinates of a target point to which the pointer 402 should be shifted in accordance with the movement of pointing device 401 based on a result of the determination.

As shown in FIGS. 4A and 4B, the pointer 402 may move according to whether the pointing device 401 moves vertically or horizontally and/or rotates (or moves). The moving speed and direction of the pointer 402 may correspond to the moving speed and direction of the pointing device 401.

The pointer 402 may move in accordance with the movement of the pointing device 401. Alternatively, an operation command may be input to the image display apparatus 100 in response to the movement of the pointing device 401. That is, as the pointing device 401 moves back and forth, an image displayed on the image display apparatus 100 may be gradually enlarged or reduced. This exemplary embodiment of the present invention does not limit the scope and spirit of other embodiments of the present invention.

Figure 5:
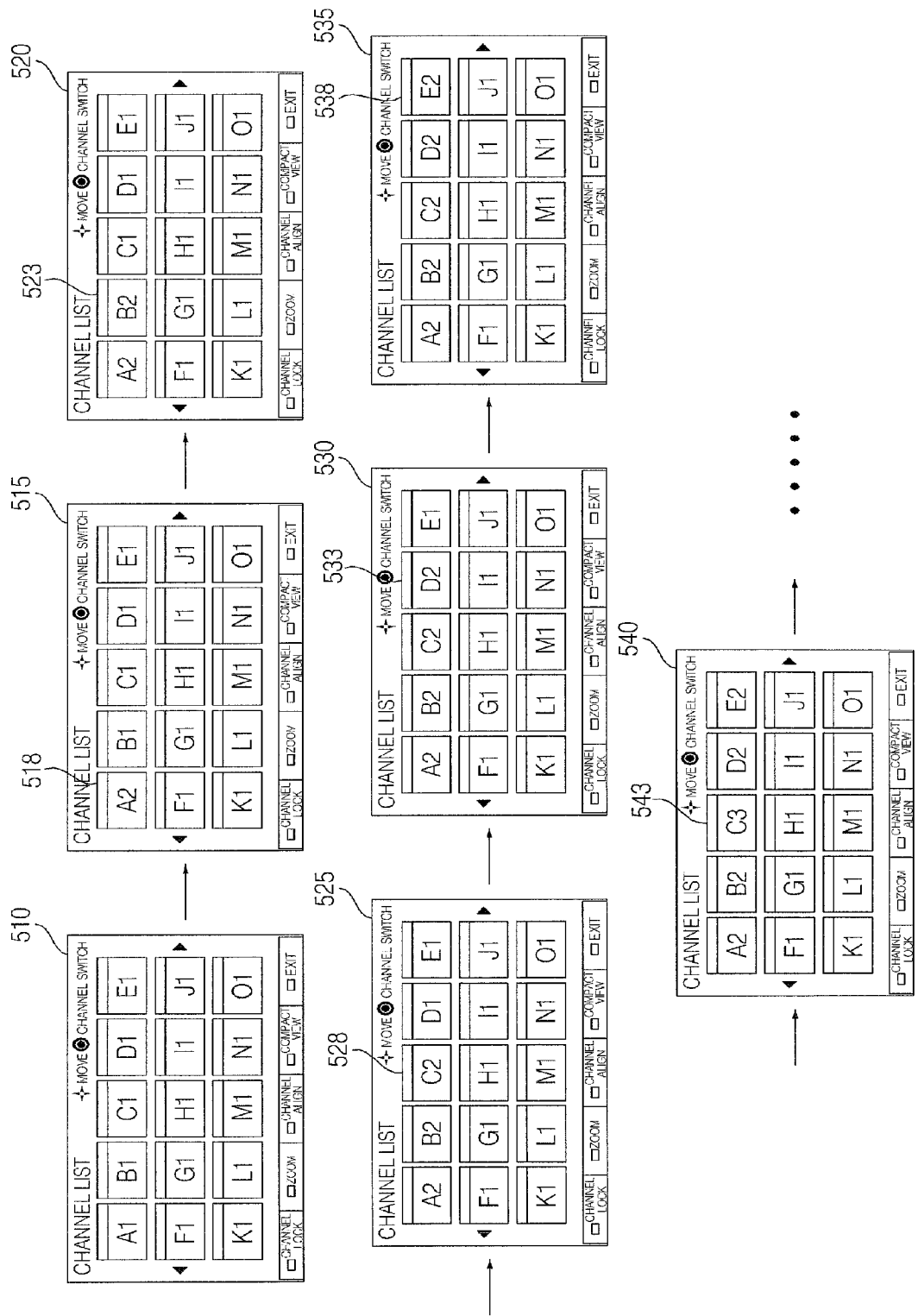
FIG. 5 is a diagram showing a method for updating a thumbnail list according to an exemplary embodiment of the present invention.

FIG. 5 illustrates a method for updating a thumbnail list according to an exemplary embodiment of the present invention. Other embodiments and configurations may also be within the scope of the present invention.

The following description is made in the context of a channel list based on television signals (or broadcast signals), not an external input image list based on external input signals, as a thumbnail list.

As shown in FIG. 5, when a channel list display command is issued, a thumbnail list 510 may be displayed on the display 180 that includes thumbnail images corresponding to broadcast signals of received channels. "Channel List" may be displayed in an upper part of the display 180. The thumbnail images may be displayed in an entire area of the display 180 in a full-view mode as shown in FIG. 5, which should not be construed as limiting embodiments of the present invention. Rather than the full-view mode, the thumbnail images may be displayed in a compact-view mode. In this manner, the user may intuitively identify contents of broadcast programs transmitted on different channels.

The thumbnail images listed in the thumbnail list 510 may be still images or moving pictures. Additionally, the thumbnail images may be images being currently received or preliminarily stored images. The thumbnail images may be images that have been processed and generated by the channel browsing processor 170.

For ease of illustration and description, thumbnail images corresponding to channels DTV 1-1 to DTV 15-1 are denoted by A1 to O1, respectively, in the thumbnail list 510 of FIG. 5.

With the thumbnail list 510 displayed on the display 180, at least one of the thumbnail images corresponding to received broadcast signals may be updated. An updated thumbnail list including the updated thumbnail image may be newly displayed on the display 180.

In FIG. 5, a thumbnail image corresponding to each channel may be updated. Although the thumbnail images may be sequentially or periodically updated, the update period of a thumbnail image corresponding to a specific channel may be shorter than the update period of a thumbnail image corresponding to another channel, as shown in FIG. 5. A frequency of change in the image of a thumbnail image may be greater than a frequency of change in other thumbnail images during a prescribed time period.

A specific channel may be a channel corresponding to a thumbnail image focused by a cursor (not shown) or a pointer (not shown) according to a user manipulation. Because the start times of programs are known from broadcasting information such as an EPG, the specific channel may be a channel that has started a new program. The specific channel may be a channel that has ended an on-going program or a channel that was registered as preferred.

In this manner, as a thumbnail image corresponding to a channel that the user is or may be interested in is displayed with a shorter update period, a user convenience may increase in channel selection. The update period of a thumbnail image corresponding to a channel may be set to be different from the update period of a thumbnail image corresponding to another channel according to a selection frequency, a viewing time, and/or a popularity ranking of the channel.

In FIG. 5, the thumbnail image update may occur, for example, in an order of a thumbnail image 518 corresponding to DTV 1-1, a thumbnail image 523 corresponding to DTV 2-1, a thumbnail image 528 corresponding to DTV 3-1, a thumbnail image 533 corresponding to DTV 4-1, a thumbnail image 538 corresponding to DTV 5-1, and a thumbnail image 543 corresponding to DTV 3-1 again. Updated channel lists 515, 520, 525, 530, 535 and 540 each including an updated thumbnail image are displayed. The updated thumbnail images may be denoted as A2, B2, C2, D2, and E2 as shown in the updated channel lists 515, 520, 525, 530, 535, and 540. It is noted from FIG. 5 that the update period of the thumbnail image corresponding to DTV 3-1 may be shorter than the update period of the thumbnail images corresponding to the other channels.

While 15 thumbnail images are shown (i.e., listed) in the thumbnail list 510 in FIG. 5, the number of thumbnails in the thumbnail list 510 may vary. The thumbnail list 510 may be a latest thumbnail list displayed on the display 180.

When a command to move the cursor or the pointer is issued with the thumbnail list 150 displayed on the display 180, the cursor or the pointer may move in a direction such as up, down, left, right, and/or the like. If an item is selected after movement of the cursor or the pointer, an operation corresponding to the selected item may be performed. Movement of the cursor or the pointer and the item selection may be implemented by input of a directional key and a selection key of a remote controller (or a pointing device), or an operation input and a selection input of a pointing device.

The thumbnail list displayed on the display 180 may include an edit menu based on the displayed thumbnail images. The edit menu may include menu items "Channel Lock", "Zoom", "Channel Align", "Compact View", and "Exit" at a bottom of the display 180, for example. A selected thumbnail image may be locked by Channel Lock so that it may not be edited, a thumbnail image or a thumbnail list may be displayed in an enlarged or reduced manner by Zoom, thumbnail images may be displayed in order by Channel Align, an image of a selected channel may be displayed in a part of the display 180, while thumbnail images may be displayed in another part of the display 180, by Compact View, and the user may move from "Channel List" to another menu by Exit. The edit menu may further include menu items "Edit" (not shown) for editing a selected thumbnail image, "Previous" for displaying a thumbnail list previous to the displayed thumbnail list, and "Next" for displaying a thumbnail list following the displayed thumbnail list.

When the menu item Zoom is selected (i.e., when a command to change the number of displayed thumbnail images is issued), the number of thumbnail images displayed in the thumbnail list may change.

When an edit command is issued with the thumbnail list displayed on the display 180, a broadcast signal corresponding to a selected thumbnail image may be edited, for example, registered as preferred, as deleted, and/or as locked.

If a next screen display command or a previous screen display command is issued with the thumbnail list displayed on the display 180, the next or previous screen may be displayed dragged, scrolled, and/or three-dimensionally rotated.

Figure 6B:
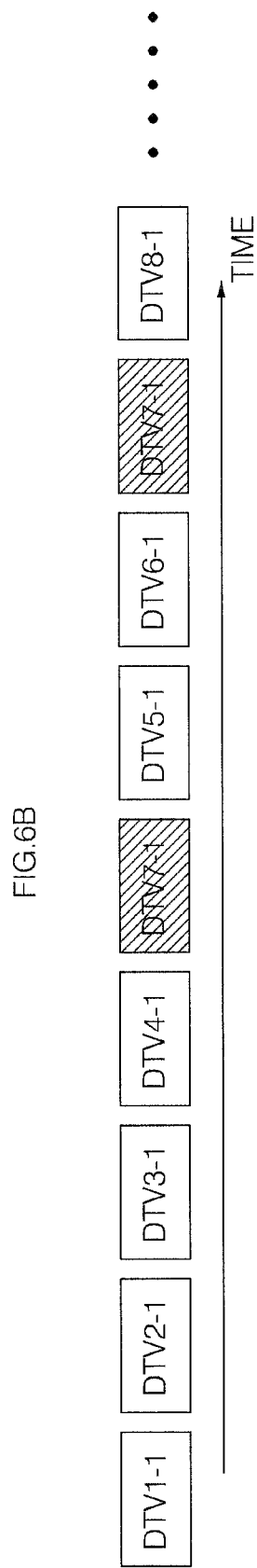

FIG. 6 is a diagram showing methods for updating broadcast signals according to exemplary embodiments of the present invention. Other embodiments and configurations are also within the scope of the present invention. FIG. 6 shows only channels for which thumbnail images are updated.

As shown in FIG. 6(*a*), thumbnail images corresponding to channels may be updated over time. The thumbnail image update may begin with DTV 1-1 and may proceed with the following thumbnail images corresponding to the other channels. Among the channels, the update period of DTV 3-1 may be shorter than the update period of the other channels. In FIG. 6(*a*), DTV 3-1 may be updated once every three updates. When DTV 3-1 is focused in the thumbnail list, the update period of DTV 3-1 may be set to be shorter than the update period of the other channels, thereby increasing user convenience.

As shown in FIG. 6(*b*), thumbnail images may be sequentially updated, starting from a thumbnail image corresponding to DTV 1-1. Among the channels, the update period of DTV 7-1 may be shorter than the update period of the other channels. For example, if DTV 7-1 is now starting a new program as indicated from an EPG, the update period of DTV 7-1 may be set to be shorter than the update period of the other channels. Thus, user convenience may increase in channel selection.

FIG. 7 is a diagram showing methods for generating thumbnails of broadcast signals according to exemplary embodiments of the present invention. Other embodiments and configurations are also within the scope of the present invention. FIG. 7 shows only channels for which thumbnail images are updated.

As shown in FIG. 7(*a*), broadcast signals of all of the broadcast channels stored in advance in the storage 175 may be received and thumbnail images may be generated in correspondence with the broadcast signals. If all the pre-stored broadcast channels are N channels DTV 1-1 to DTV N–1, thumbnail images corresponding to broadcast signals of the N channels may be generated. The channel browsing processor 170 may take charge of generating the thumbnail images. All of the N thumbnail images may be updated, for example.

As shown in FIG. 7(*b*), only a predetermined number of thumbnail images that can be accommodated in a thumbnail list may be generated, rather than thumbnail images corresponding to all of the broadcast channels stored in advance in the storage 175 being generated. For example, if a first thumbnail list List 1 includes 15 thumbnail images corresponding to channels DTV 1-1 to DTV 15-1, only 15 thumbnail images may be generated. Additionally, only the 15 thumbnail images may be updated, for example.

A second thumbnail list List 2 may include only 15 thumbnail images corresponding to channels DTV 16-1 to DTV 30-1. Thus, only 15 thumbnail images may be generated and updated. In this manner, up to $M^{th}$ thumbnail list List M may be configured.

The first to $M^{th}$ thumbnail lists List 1 to List M may be selectively displayed on the display 180 according to a user command such as a previous thumbnail list display command, a next thumbnail list display command, and/or the like.

Figure 8A:
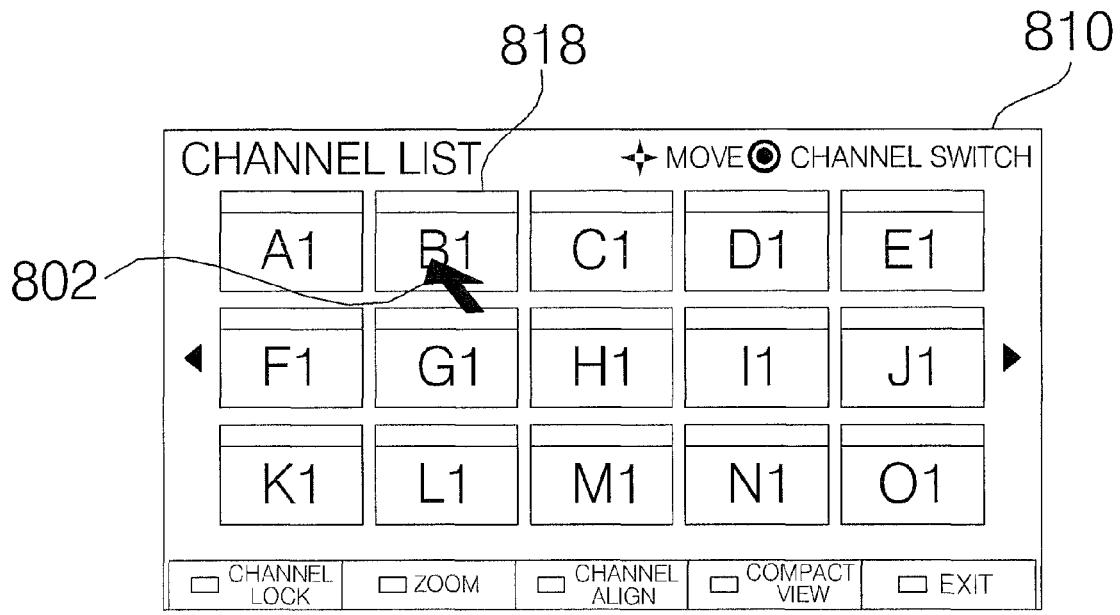
FIGS. 8A to 8B are diagrams showing a method for updating a thumbnail list according to an exemplary embodiment of the present invention.
Figure 8B:
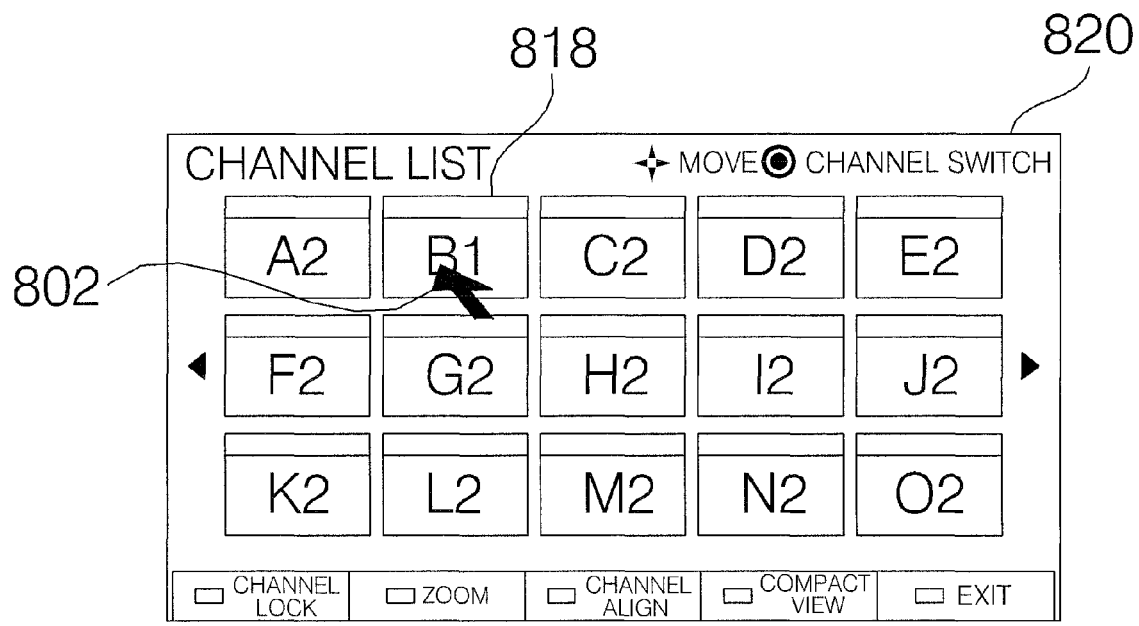

FIG. 8 is a diagram showing a method for updating a thumbnail list according to an exemplary embodiment of the present invention. Other embodiments and configurations are also within the scope of the present invention.

As shown in FIG. 8, when a channel list display command is issued, a thumbnail list 810 may be displayed on the display 180, which may include thumbnail images corresponding to broadcast signals of received channels.

"Channel List" may be displayed at an upper part of the display 180, for example. While the thumbnail images are shown to be displayed in the entire area of the display 180 in a full-view mode in FIG. 8, embodiments of the present invention are not so limited. The thumbnail images may also be displayed in a compact-view mode.

Since the thumbnail list 810 including a plurality of thumbnail images may be displayed on the display 180, the user may intuitively identify contents of broadcast signals transmitted on different channels.

For ease of description, contents of thumbnail images corresponding to channels DTV 1-1 to DTV 15-1 may be denoted by A1 to O1, respectively in the thumbnail list 810.

With the thumbnail list 810 displayed on the display 180, at least one of thumbnail images corresponding to received broadcast signals may be updated.

When a thumbnail image is selected or focused in the displayed thumbnail list 810 by the user, the other thumbnails may be updated although the selected thumbnail image is not updated.

If a thumbnail image 818 corresponding to DTV 2-1 is focused by means of a pointer 802 as shown in FIG. 8(*a*), a thumbnail list 820 may be displayed on the display 180, in which all other thumbnail images except for the focused thumbnail image 818 are updated. The updated thumbnails may be identified by changing an identification label of "1" to "2".

Since the focused thumbnail image 818 is updated in a different period from the other thumbnail images, the thumbnail image of interest may catch the eye of the user from among a plurality of thumbnail images.

While a thumbnail image kept not updated is shown to be a thumbnail image corresponding to a broadcast channel in FIG. 8, the thumbnail image may not be limited to a broadcast channel. If a thumbnail image corresponding to an external input signal is focused while a thumbnail list with thumbnail images of external input signals is displayed on the display 180, the focused thumbnail image may not be updated.

Unlike the thumbnail image updating method shown in FIG. 8, it may be further contemplated that a thumbnail image corresponding to a broadcast signal of a channel that has started a new program is not updated, while another thumbnail image is updated.

A thumbnail image corresponding to a broadcast signal of a channel that has ended an on-going program may not be updated, while another thumbnail image may be updated.

Figure 9:
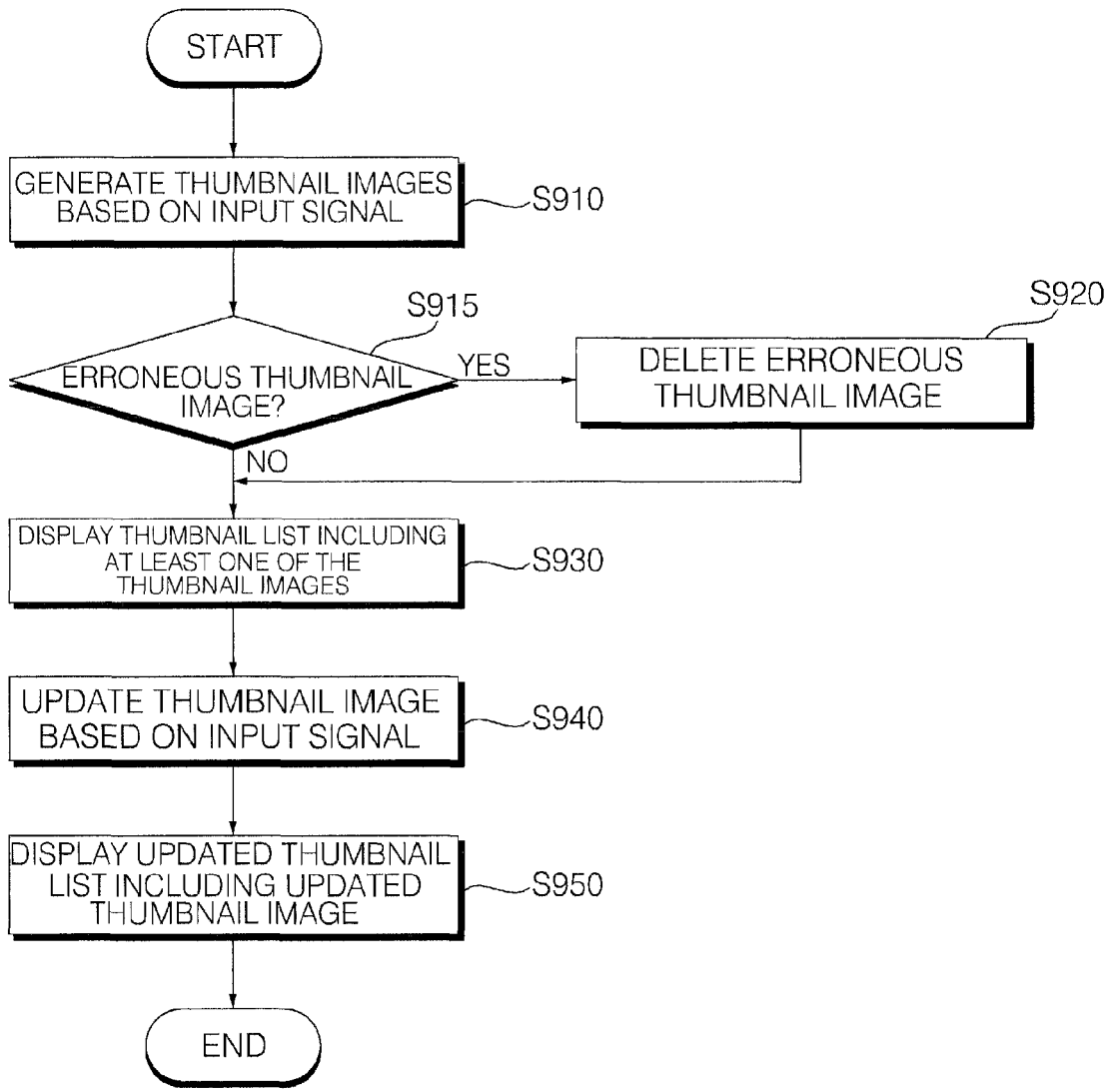
FIG. 9 is a flowchart of a method for operating an image display apparatus according to an exemplary embodiment of the present invention.

FIG. 9 is a flowchart of a method for operating an image display apparatus according to an exemplary embodiment of the present invention. Other operations, orders of operations and embodiments are also within the scope of the present invention.

As shown in FIG. 9, a plurality of thumbnail images may be generated based on an input signal in operation S910. The input signal may be a broadcast signal or an external input signal. The channel browsing processor 170 may generate the plurality of thumbnail images based on the input broadcast signal, upon receipt of a channel list display command.

In operation S915, a determination may be made for each of the thumbnail images whether the thumbnail image is erroneous. The error check may be performed by the controller 160, and more particularly by the error detector 220. For example, the error detector 220 may determine whether the thumbnail image has an error by examining at least one of size information, syntax information, checksum information, continuity information, and/or content information of the thumbnail image.

If the thumbnail image is erroneous, the thumbnail image may be deleted in operation S920. The erroneous thumbnail image may be eliminated from a thumbnail list and thus updating of the thumbnail image may be terminated. When an error occurs during updating a thumbnail image, the original thumbnail image prior to the updating may still be maintained in the thumbnail list.

If the thumbnail images are normal, a thumbnail list including at least one of the generated thumbnail images may be displayed on the display 180 in operation S930. In the case where thumbnail images are generated for all channels as shown in FIG. 7(*a*), as many thumbnail images as the thumbnail list can accommodate may be displayed on the display 180. For example, 15 thumbnail images may be displayed, as shown in FIG. 5.

Alternatively, only as many thumbnail images as the thumbnail list can accommodate may be generated, as shown in FIG. 7(*b*).

In operation S940, thumbnail images may be updated based on an input signal. As shown in FIGS. 5 and 6, thumbnail images corresponding to broadcast channels may be updated in such a manner that the update period of a thumbnail image corresponding to a specific channel may be different from the update period of a thumbnail image corresponding to another channel.

For example, the update period of a thumbnail image corresponding to a specific channel may be set to be shorter than the update period of a thumbnail image corresponding to another channel, or the thumbnail image corresponding to the specific channel may not be updated, while the thumbnail image corresponding to another channel is updated.

The specific channel may be a channel corresponding to a thumbnail image focused by a cursor or a pointer according to a user manipulation. As start times of programs are known from broadcasting information such as an EPG, the specific channel may be a channel that has started a new program or a channel that has ended an on-going program. The specific channel may also be a channel registered as preferred.

An updated thumbnail list including the updated thumbnail image may be displayed in operation S950. If the thumbnail images corresponding to the channels are sequentially updated as shown in FIGS. 5 and 6, each updated thumbnail list having an updated thumbnail image may be displayed on the display 180.

A thumbnail image corresponding to a channel focused by a pointer, a thumbnail image corresponding to a channel that has started a new program, and/or a thumbnail image corresponding to a channel that has ended an on-going program may be updated in a shorter period, and/or not updated. Therefore, user convenience of channel selection may increase.

An operation method of an image display apparatus may be implemented as code that can be written on a computer-readable recording medium and may thus be read by a processor. The computer-readable recording medium may be any type of recording device in which data is stored in a computer-readable manner.

Examples of the computer-readable recording medium may include a ROM, a RAM, a CD-ROM, a magnetic tape, a floppy disc, an optical data storage, and/or a carrier wave (e.g., data transmission through the internet). The computer-readable recording medium may be distributed over a plurality of computer systems connected to a network so that computer-readable code may be written thereto and executed therefrom in a decentralized manner. Functional programs, code, and code segments may be needed for realizing embodiments herein may be construed by one of ordinary skill in the art.

A thumbnail list that includes a plurality of thumbnail images may be displayed and one of the thumbnail images may be updated in a different update period from another thumbnail image. Therefore, a user may easily select an input image.

Especially when broadcast signals are represented as thumbnail images, a short update period may be set for a broadcast signal of a user-preferred channel and/or a channel that has stated a new program, thus increasing user convenience.

A thumbnail list may be displayed, which may include thumbnail images corresponding to broadcast signals received on channels. Accordingly, the user may intuitively identify contents of the broadcast signals of the received channels.

At least one embodiment may provide an image display apparatus and an operation method of the image display apparatus that may enable a user to easily select a channel.

A method for operating an image display apparatus may include generating a plurality of thumbnail images based on an input signal, displaying a thumbnail list including at least one of the plurality of the generated thumbnail images, and updating at least one of the thumbnail images included in the thumbnail list. An update period of a thumbnail image may be different from an update period of another thumbnail image in the thumbnail list.

An image display apparatus may include a display for displaying a thumbnail list including a plurality of thumbnail images based on an input signal, and a controller for setting an update period of a thumbnail image to be different from an update period of another thumbnail image in the thumbnail list during thumbnail image updating.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for updating thumbnail images in a thumbnail list, comprising:
generating a plurality of thumbnail images based on television channels;
providing a thumbnail list including a portion or all of the plurality of the generated thumbnail images for output to a display;
updating the thumbnail list such that an image of at least one thumbnail image is changed, wherein a frequency of change in the image of the at least one thumbnail image is greater than a frequency of change in other thumbnail images in the thumbnail list during a prescribed time period, wherein the frequency of change is based on a user preference; and
providing the updated thumbnail list for output to a display.

2. The method according to claim 1, wherein the user preference is based on a favorite channel, a not interested channel or a beginning of a new program.

3. The method according to claim 1, wherein the at least one thumbnail image that is updated is a thumbnail selected by a user.

4. The method according to claim 1, wherein in updating the thumbnail list, images of some thumbnails do not change.

5. The method according to claim 1, wherein the prescribed time period of the at least one thumbnail is different from an update period of another thumbnail image in the thumbnail list.

6. The method according to claim 5, wherein an update period of a focused thumbnail image is shorter than an update period of another thumbnail image in the thumbnail list.

7. The method according to claim 1, further comprising displaying the updated thumbnail list including the at least one updated thumbnail image on the display.

8. The method according to claim 1, wherein in the updated thumbnail list, a focused thumbnail image is not updated.

9. The method according to claim 1, wherein updating the thumbnail list includes updating thumbnail images corresponding to broadcast signals of all of preliminarily stored channels.

10. The method according to claim 1, wherein the thumbnail images are still images or moving pictures.

11. An image display apparatus comprising:
a display; and a controller for providing a plurality of thumbnail images based on television channels, for providing a thumbnail list including a portion or all of the plurality of the provided thumbnail images for output to the display, for updating the thumbnail list such that an image of at least one thumbnail image is changed and for providing the updated thumbnail list for output to the display, wherein a frequency of change in the image of the at least one thumbnail image is greater than a frequency of change in the other thumbnail images in the thumbnail list during a prescribed time period, and wherein the frequency of change is based on a user preference.

12. The image display apparatus according to claim 11, wherein the user preference is based on a favorite channel, a not interested channel or a beginning of a new program.

13. The image display apparatus according to claim 11, wherein the at least one thumbnail image that is updated is a thumbnail selected by a user.

14. The image display apparatus according to claim 11, wherein in updating the thumbnail list, some thumbnails do not change.

15. The image display apparatus according to claim 11, wherein the prescribed time period of the at least one thumbnail is different from an update period of another thumbnail image in the thumbnail list.

16. The image display apparatus according to claim 11, wherein an update period of a focused thumbnail image is shorter than an update period of another thumbnail image in the thumbnail list.

17. The image display apparatus according to claim 11, wherein the controller includes a channel browsing processor for generating the thumbnail images based on a received television signal.

18. The image display apparatus according to claim 11, wherein the thumbnail images are still images or moving pictures.

19. A method for updating thumbnail images in a thumbnail list, comprising:

generating a plurality of thumbnail images based on television channels;

providing a thumbnail list including a portion or all of the plurality of the generated thumbnail images for output to a display;

updating the thumbnail list such that an image of at least one thumbnail image is changed, wherein a frequency of change in the image of the at least one thumbnail image is greater than a frequency of change in other thumbnail images in the thumbnail list during a prescribed time period, wherein the at least one thumbnail image that is updated is a thumbnail selected by a user; and providing the updated thumbnail list for output to a display.

* * * * *